(12) United States Patent
Ding et al.

(10) Patent No.: US 11,007,484 B2
(45) Date of Patent: May 18, 2021

(54) DEAD END MEMBRANE GAS SEPARATION PROCESS

(71) Applicant: Air Liquide Advanced Technologies U.S. LLC, Houston, TX (US)

(72) Inventors: Yong Ding, Waban, MA (US); Benjamin Bikson, Brookline, MA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 277 days.

(21) Appl. No.: 16/114,984

(22) Filed: Aug. 28, 2018

(65) Prior Publication Data

US 2019/0060835 A1    Feb. 28, 2019

Related U.S. Application Data

(60) Provisional application No. 62/550,712, filed on Aug. 28, 2017.

(51) Int. Cl.
*B01D 61/36* (2006.01)
*B01D 53/22* (2006.01)
(Continued)

(52) U.S. Cl.
CPC ........... *B01D 61/36* (2013.01); *B01D 53/002* (2013.01); *B01D 53/226* (2013.01); *B01D 53/228* (2013.01); *B01D 53/229* (2013.01); *B01D 61/362* (2013.01); *B01D 61/58* (2013.01); *B01D 69/12* (2013.01); *B01D 71/16* (2013.01); *B01D 71/38* (2013.01); *B01D 71/48* (2013.01);
(Continued)

(58) Field of Classification Search
CPC ...... B01D 2257/7022; B01D 2257/504; B01D 71/16; B01D 69/12; B01D 2256/24; B01D 2257/702; B01D 2256/16; B01D 2257/108; B01D 2257/304; B01D 53/229; B01D 2257/7025; B01D 2256/245; B01D 61/58; B01D 2257/102; B01D 2257/104; B01D 61/362; B01D 61/36; B01D 71/38; B01D 71/48; B01D 71/52; B01D 71/68; B01D 71/54; B01D 2311/14; B01D 2311/25; B01D 2221/04; B01D 2313/18; B01D 2257/708; B01D 2257/80; B01D 53/002; B01D 53/228; B01D 71/32; B01D 53/226; B01D 2053/224
USPC ................................ 585/818, 820, 823, 824
See application file for complete search history.

(56) References Cited

U.S. PATENT DOCUMENTS 3,528,217 A    9/1970    Garrett
3,616,928 A    11/1971   Rosenblatt
(Continued)

FOREIGN PATENT DOCUMENTS

WO    WO 00/33941    6/2000

OTHER PUBLICATIONS

International Search Report and Written Opinion for PCT/US2018/048326, dated Oct. 29, 2018.

*Primary Examiner* — Thuan D Dang
(74) *Attorney, Agent, or Firm* — Christopher J. Cronin

(57) ABSTRACT

A feed fluid mixture including at least one condensable component and at least one non-condensable component is separated into a gaseous permeate and an at least partially liquid retentate with a gas separation membrane through simultaneous condensation of at least one of said at least one condensable component on a retentate side of the membrane and permeation of at least one of said at least one non-condensable component through the membrane.

39 Claims, 7 Drawing Sheets

(51) Int. Cl.
 B01D 61/58 (2006.01)
 B01D 71/16 (2006.01)
 B01D 71/38 (2006.01)
 B01D 71/48 (2006.01)
 B01D 71/54 (2006.01)
 B01D 71/68 (2006.01)
 B01D 53/00 (2006.01)
 B01D 69/12 (2006.01)
 B01D 71/52 (2006.01)
 B01D 71/32 (2006.01)

(52) U.S. Cl.
 CPC ............ B01D 71/54 (2013.01); B01D 71/68 (2013.01); *B01D 71/32* (2013.01); *B01D 71/52* (2013.01); *B01D 2053/224* (2013.01); *B01D 2221/04* (2013.01); *B01D 2256/16* (2013.01); *B01D 2256/24* (2013.01); *B01D 2256/245* (2013.01); *B01D 2257/102* (2013.01); *B01D 2257/104* (2013.01); *B01D 2257/108* (2013.01); *B01D 2257/304* (2013.01); *B01D 2257/504* (2013.01); *B01D 2257/702* (2013.01); *B01D 2257/708* (2013.01); *B01D 2257/7022* (2013.01); *B01D 2257/7025* (2013.01); *B01D 2257/80* (2013.01); *B01D 2311/14* (2013.01); *B01D 2311/25* (2013.01); *B01D 2313/18* (2013.01)

(56) References Cited

U.S. PATENT DOCUMENTS

| | | |
|---|---|---|
| 4,659,343 A | 4/1987 | Kelly |
| 4,772,295 A | 9/1988 | Kato et al. |
| 4,857,078 A | 8/1989 | Watler |
| 4,963,165 A | 10/1990 | Blume et al. |
| 5,089,033 A | 2/1992 | Wijmans |
| 5,199,962 A | 4/1993 | Wijmans |
| 5,205,843 A | 4/1993 | Kaschemekat et al. |
| 5,281,255 A | 1/1994 | Toy et al. |
| 5,306,330 A | 4/1994 | Nasikas |
| 5,352,272 A | 10/1994 | Moll et al. |
| 5,374,300 A | 12/1994 | Kaschemekat et al. |
| 5,501,722 A | 3/1996 | Toy et al. |
| 5,762,685 A | 6/1998 | Baker et al. |
| 5,769,926 A | 6/1998 | Lokhandwala et al. |
| 5,772,733 A | 6/1998 | Lokhandwala et al. |
| 5,902,747 A | 5/1999 | Nemser et al. |
| 6,053,965 A | 4/2000 | Lokhandwala |
| 6,361,582 B1 | 3/2002 | Pinnau et al. |
| 6,372,019 B1 | 4/2002 | Alferov et al. |
| 6,524,368 B2 | 2/2003 | Betting et al. |
| 6,579,341 B2 | 6/2003 | Baker et al. |
| 6,723,152 B2 | 4/2004 | Bikson et al. |
| 6,887,408 B2 | 5/2005 | Yuan |
| 6,896,717 B2 | 5/2005 | Pinnau et al. |
| 6,923,846 B2 | 8/2005 | Nelson et al. |
| 7,799,964 B2 | 9/2010 | Minhas et al. |
| 7,875,758 B2 | 1/2011 | Sanders, Jr. et al. |
| 8,197,578 B2 | 6/2012 | Hruby et al. |
| 8,506,815 B2 | 8/2013 | Nemser et al. |
| 8,828,121 B1 | 9/2014 | He et al. |
| 8,906,143 B2 | 12/2014 | Lokhandwala |
| 9,221,730 B2 | 12/2015 | Lokhandwala et al. |
| 9,662,609 B2 | 5/2017 | Cnop et al. |
| 2016/0279561 A1 | 9/2016 | Burgers et al. |
| 2016/0326446 A1 | 11/2016 | Lokhandwala et al. |
| 2017/0157557 A1 | 6/2017 | Ding et al. |
| 2017/0203257 A1 | 7/2017 | Ding et al. |

DEAD END MEMBRANE GAS SEPARATION PROCESS

CROSS-REFERENCE TO RELATED APPLICATIONS

This application claims the benefit of U.S. Provisional Application No. 62/550,712, filed Aug. 28, 2017.

BACKGROUND

Field of the Invention

The present invention relates to the separation of a gas mixture using a gas separation membrane module, more particularly, the separation of condensable components of a gas mixture from incondensable components using a gas separation membrane module.

Related Art

There is a worldwide drive to increase utilization of natural gas while reducing the energy consumption that is associated with extraction, purification and transportation of the gas. The process of extraction and recovery of Natural Gas Liquids (NGLs) is an important part of natural gas utilization. The NGL recovery process must be flexible enough to accommodate a range of natural gas compositions, including gas compositions with high concentration of ethane and acid gases, such as $H_2S$ and $CO_2$. A number of methods are known in the art for liquefaction of the gas.

The NGLs can be recovered by a number of methods. Some of most common methods are compression, straight refrigeration, cascade absorption, adsorption, ambient temperature absorption, Joule-Thomson expansion and turbo expansion.

A widely used method for liquefaction of gas includes compression of gas in a compressor with preliminary cooling in a heat exchanger. The compressed gas is then further cooled in an expander with expansion of the gas through a throttle valve thereby causing cooling and condensation. Subsequently, the liquid phase is collected and separated.

One method for the separation of the components of gas mixture by means of liquefaction includes cooling of the gas mixture in stages. This is carried out by cooling the gas down to the condensation temperature of the highest boiling point component that is desired for recovery. The resultant liquefied component is then separated from the remaining gas. The remaining gas is subsequently cooled down to the condensation temperature of the next highest boiling point component that is desired for recovery. Similarly, the resultant liquefied component is then separated from the remaining gas. This process is continued until each component desired for recovery has been separated from the gas. Those skilled in the art will recognize that this staged process is complex and requires a relatively large amount of energy.

Another known method of gas liquefaction is adiabatic cooling of the gas mixture in a supersonic nozzle followed by separation of the liquid phase as disclosed in U.S. Pat. No. 3,528,217. Similar methods are disclosed by U.S. Pat. Nos. 5,306,330, 6,372,019 and 6,524,368.

Heavy hydrocarbons can be separated from hydrocarbon gas mixtures such as natural gas streams by selective gas permeation membrane processes, examples of which include those disclosed in U.S. Pat. Nos. 4,857,078, 5,281,255 and 5,501,722. Membrane gas separation processes can be further used to separate acid gases from natural gas stream as taught, for example, by U.S. Pat. No. 4,963,165, US 20170157556 A1, and US 20170157557 A1. One particular process for conditioning natural gas containing $C_{3+}$ hydrocarbons in order to adjust the caloric level of the gas, so that it can be used as a combustion fuel, is disclosed by U.S. Pat. No. 6,053,965. The process optionally can also produce natural gas liquids, NGL's.

Membrane gas separation processes can operate in condensing mode wherein a condensable component of a gas stream is liquefied during gas permeation and is removed in parallel with the non-permeate gas stream as a co-product. Condensing mode gas separation processes are described in U.S. Pat. Nos. 5,089,033, 5,199,962, 5,205,843 and 5,374,300.

The prior art membrane processes are directed to gas separation that, in presence of JT cooling, can further generate condensate liquids. The liquids recovered during the gas separation process can contain high concentrations of off-specification amounts of volatile gases that are dissolved in the condensate liquid. It can therefore be necessary at times to limit the concentration of the volatile gases, such as methane, ethane and carbon dioxide, that are dissolved in the liquid condensate. In order to limit such concentrations, prior to transportation of the recovered liquids, further processing, such as in a stripping column, will be necessary in order to remove amounts of those dissolved volatile gases.

As mentioned above, a common method for liquefaction of gas includes compression of gas in a compressor, preliminary cooling in a heat exchanger, and further cooling of the gas through a throttle valve. The JT cooling caused by expansion of the gas in the throttle valve causes components in the expanded gas to condense. The result liquid phase is collected and separated. In order to prevent formation of solids and freezing at or out of the throttle valve, however, the gas must be dehydrated prior to JT cooling. Alternatively, methanol may be injected into the gas stream in order to prevent such solids formation. The liquids collected will then typically comprise a mixture of condensable gas components that contains a substantial fraction of dissolved volatile components present in the original gas mixture.

The above-described process can be highly inefficient for some lean gas mixtures wherein expansion through a throttle valve may generate cooling but not enough to allow formation of liquid condensate, thus making the process inefficient.

Thus, there is a need for a more efficient process for recovery of liquid condensate, such as NGLs, from a fluid mixture that avoids the above-mentioned problems.

SUMMARY

There is provided a method of separating components of fluid mixtures by simultaneous condensation and membrane permeation to yield a product permeate gas and an at least partially liquid product retentate. The method comprises the following steps. A fluid mixture feed stream containing at least one condensable gas component and at least one non-condensable gas component is fed to a gas separation module containing at least one gas separation membrane. A permeate gas product stream is withdrawn from said gas separation module enriched in said at least one non-condensable gas component in comparison to the feed fluid mixture stream, thereby leaving a retentate that deficient in said at least one condensable gas component in comparison to the feed, the retentate being either wholly or partially liquid, said permeate gas product stream being at a pressure of at least 3 atm lower than that of said feed fluid mixture.

From the retentate in the gas separation module, a liquid retentate product stream is withdrawn that is enriched in said at least one condensable component in comparison to the feed fluid mixture stream.

Any one or more of the above-disclosed methods may include one or more of the following aspects:

- the fluid mixture feed stream further contains condensable water vapor and at least some of said water vapor permeates through said membrane and is withdrawn as part of the permeate product gas stream.
- the fluid mixture feed stream is natural gas containing methane and ethane as non-condensable gas components.
- the natural gas stream further contains $CO_2$.
- a ratio of a volumetric flow rate of the permeate gas stream to a volumetric flow rate of the feed fluid mixture ranges from 0.7 to 1.0.
- the membrane(s) is configured as a flat sheet(s) or as hollow fibers.
- the membrane has a separation layer.
- the membrane is a composite membrane including a separation layer that is extruded with, or coated upon, a substrate support layer that is chemically distinct from the separation layer.
- the membrane is a composite membrane including a separation layer that is extruded with, or coated upon, a substrate support layer that is chemically distinct from the separation layer, the substrate being polymeric.
- the separation layer is made of an amorphous perfluoropolymer.
- the substrate is made of a poly(aryl ether ketone).
- the substrate is made of a poly(ether ether ketone).
- the membrane is an asymmetric membrane.
- the material of the separation layer is a polymer exhibiting a selectivity for the incondensable component(s) over the condensable component(s).
- the at least one non-condensable gas comprises a main component having a highest concentration of all of the components of the at least one non-condensable gas, a selectivity of the membrane for the main component of the incondensable gases over each of the condensable gas(es) being at least about 1.5, typically greater than or equal to 2.0, and optionally as high as 500.
- the at least one non-condensable gas comprises a main component having a highest concentration of all of the components of the at least one non-condensable gas, a permeance of the main component of the at least one non-condensable gas in the membrane being at least 10 GPU, more typically at least 50 GPU or 100 GPU, and optionally as high as 1000 GPU where 1 GPU=$10^{-6}$ cm$^3$ (STP)·cm$^{-2}$·s$^{-1}$·(cm Hg)$^{-1}$.
- a material of the separation layer is one or more of polymers, copolymers, elastomers, ceramics, and carbon molecular sieve (CMS) membrane materials.
- a material of the selective layer is at least one of: polysulfones; poly(styrenes), including styrene-containing copolymers such as acrylonitrilestyrene copolymers, styrene-butadiene copolymers and styrene-vinylbenzylhalide copolymers; polycarbonates; polyfurfuryl alcohol; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; polyaryletherketones; polyetheretherketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polypyrrolones; polysulfides; polymers from monomers having alpha-olefinic unsaturation other than mentioned above such as poly(ethylene), poly(propylene), poly(butene-I), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), poly(vinyl sulfates); polyallyls; poly(benzobenzimidazole); polyhydrazides; polyoxadiazoles; polytriazoles; poly(benzimidazole); polycarbodiimides; polyphosphazines; interpolymers, including block interpolymers containing repeating units from the above such as terpolymers of acrylonitrile-vinyl bromide-sodium salt of para-sulfophenylmethallyl ethers; polymers of inherent microporosity (PIM); grafts and blends containing any of the foregoing; perfluoropolymers; and carbon molecular sieve (CMS) membranes made from pyrolysis of any of the foregoing.
- the separation layer has a selectivity of least 1.5 for the at least one non-condensable gas over $C_{3+}$ hydrocarbons.
- the at least one non-condensable gas is selected from one or more of oxygen, nitrogen, methane, ethane, and hydrogen.
- the selective layer is made of an amorphous perfluoropolymer.
- the amorphous perfluorinated polymer is selected from one or more of copolymers of 2,2-bistrifluoromethyl-4,5-difluoro-1,3-dioxole and tetrafluoroethylene, copolymers of 2,2,4-trifluoro-5-trifluoromethoxy-1,3-dioxole and tetrafluoroethylene, 2,2,4-trifluoro-5-trifluoromethoxy-1,3-dioxide based polymer, and poly(perfluorobutenyl vinyl ether).
- the at least one membrane comprises composite hollow fiber membranes having a substrate made of poly(ether ether ketone) and a separation layer made of a copolymer of 2,2-bistrifluoromethyl-4,5-difluoro-1,3-dioxole and tetrafluoroethylene.
- the feed fluid mixture stream is either wholly gaseous or a biphasic mixture of gas and liquid.
- the at least one condensable gas component comprises $C_{3+}$ hydrocarbons and the at least one non-condensable gas component comprises methane, ethane and carbon dioxide.
- the feed fluid mixture stream is biphasic gas/liquid at a pressure of above 6 atm, typically above 20 atm, and more typically above 40 atm.
- each of the at least one condensable gas component is a gas, which when at a pressure of 1 atm absolute, has a boiling point higher than −100° C.
- the at least one condensible gas component is selected from one or more of propane, butane, pentane, a $C_{6+}$ hydrocarbon acetone, methanol, and hexane.
- each of the at least one non-condensable gas component either:
  - when at a pressure of 1 atm absolute, has a boiling point lower than −100° C., or when at a pressure of 1 atm absolute and at room temperature (20° C.) exists as a gas and when at room temperature (20° C.)

the at least one non-condensable gas component is selected from one or more of methane, ethane, hydrogen, nitrogen, oxygen and carbon dioxide.

the retentate is biphasic gas/liquid, the gas phase of the retentate is recycled to an inlet of the gas separation membrane module with or without intermediate heating, cooling, pressurization, or combination with the fluid feed mixture stream, and the liquid retentate product stream is withdrawn from a liquid retentate port of the gas separation module.

the retentate biphasic gas/liquid and at least 50 mol % and more typically at least 70 mol % of the at least one condensable gas component is recovered in the liquid retentate product stream.

the retentate biphasic gas/liquid and at least 50 mol % and more typically at least 70 mol % of the at least one condensable gas component is recovered in the liquid retentate product stream.

a ratio of a volumetric flow rate of the permeate gas product stream to a volumetric flow rate of the feed fluid mixture stream is ranges from 0.5 to 1.0, more typically from 0.7 to 1.0.

a pressure of the feed fluid mixture stream is higher than 50 psig (3.45 barg), more typically higher than 100 psig (6.89 barg), and even more typically higher than 150 psig (10.3 barg).

a pressure of the feed fluid mixture stream is in a range of 50-1500 psig (3.45-103 barg), more typically, 100-1000 psig (6.89-70.0 barg), or even more typically, 150-900 psig (10.3-62.1 barg).

a pressure of the permeate gas product stream is 0 psig to 50 psig.

a ratio of a pressure of the feed fluid mixture stream to a pressure of the permeate gas product stream is above 2, more typically above 3, and even more typically above 5.

a pressure of the permeate gas product stream is at least 3 atm lower than that of the feed fluid mixture stream.

the fluid feed mixture is stream is a stream of unstabilized natural gas liquids comprising a mixture of $C_{1-2}$ hydrocarbons and $C_{3+}$ hydrocarbons.

the fluid feed mixture stream is a stream of associated gas.

the fluid feed mixture stream is a stream of a mixture of hydrogen and hydrocarbons, optionally from a hydrogenation plant, optionally the hydrocarbons being a mixture of $C_{1-2}$ hydrocarbons and $C_{3+}$ hydrocarbons.

the fluid feed mixture stream is a stream comprising volatile organic compound-containing industrial waste gas, the volatile organic compound optionally being selected from one or more of benzenes, esters, alcohols, ketones, alkanes, chloroalkanes, and alkenes.

the fluid feed mixture stream is a stream comprising one or more volatile organic compounds and either air or flue gas, the volatile organic compound optionally being selected from one or more of benzenes, esters, alcohols, ketones, alkanes, chloroalkanes, and alkenes.

the fluid feed mixture stream is a stream comprising volatile organic compound-containing industrial waste gas derived from manufacturing, chemical production, or petroleum refining operations.

the fluid feed mixture stream is a mixture of air and gasoline vapor the fluid feed mixture stream is a stream of unstabilized natural gas liquids or associated gas at a pressure of no greater than 13.8 bar abs, the permeate product gas stream is fuel gas for power production machinery selected from a compressor and/or a combined diesel engine and electrical generator, and the liquid retentate product stream is liquid natural gas liquids, optionally Y-grade natural gas liquids.

the fluid feed mixture stream is a stream of unstabilized natural gas liquids or associated gas at a pressure of no greater than 13.8 bar abs, the permeate product gas stream is fuel gas for power production machinery selected from a compressor and/or a combined diesel engine and electrical generator, and the liquid retentate product stream is liquid natural gas liquids, optionally Y-grade natural gas liquids and said method further comprises the step of fractionating the Y-grade natural gas liquids to yield stream of propane), iso-butane, butane, and $C_{5+}$ hydrocarbons.

the feed fluid mixture stream is a stream of a mixture of hydrogen and hydrocarbons from refinery off gases from a hydroskimmer, hydrocracker, and/or a gasoline unit, wherein the permeate product gas stream is hydrogen and the liquid retentate product stream is $C_{3+}$ hydrocarbons, optionally liquid propane gas.

a vacuum is applied to the permeate side of the one or more gas separation membranes in order to achieve a desired ratio of a pressure of the fluid feed mixture stream to a pressure of the permeate product gas stream.

the fluid feed mixture stream is optionally compressed at a compressor, optionally cooled at an optional heat exchanger.

the gas separation membrane module, to which the feed fluid mixture stream is fed, is a first stage gas separation module, the permeate product gas stream being fed, after optionally recompression, to a second gas separation membrane module comprising one or more gas separation membranes that are selective for the one or more non-condensable gas components over the one or more condensable gas components, the second stage gas separation module separating the permeate product gas stream into a further enriched permeate gas stream and a recycle retentate gas stream, the recycle retentate gas stream being fed to an inlet of the first gas separation module so as to increase recovery of the at least one non-condensable gas component.

the gas separation membrane module, to which the feed fluid mixture stream is fed, is a first stage gas separation module, the liquid retentate product stream being flashed into a biphasic liquid/vapor retentate stream with a Joule-Thomson valve and separated with a phase separator into a lowered-pressure liquid phase stream and a lowered-pressure vapor phase stream, the lowered-pressure liquid phase stream withdrawn as a product liquid, the lowered-pressure vapor phase stream being fed to a third stage gas separation membrane module, comprising one or more gas separation membranes selective for the at least one non-condensable gas component over the at least one condensable gas component at which the lowered-pressure vapor phase stream is separated into a third stage permeate gas and a third stage retentate gas, the third stage retentate gas being optionally recycled to the phase separator so as to increase recovery of the at least one non-condensable gas component.

at least 90% of the at least one non-condensable gas component of the fluid mixture feed stream from the gas mixture permeates across the one or more membranes.

the retentate and the permeate product gas stream flow inside the gas separation module in co-current fashion.

the retentate and the permeate product gas stream flow inside the gas separation module in cross-flow fashion.

most of the at least one condensable gas component of the fluid mixture feed stream is condensed inside the gas separation membrane module.

the at least one non-condensable gas component comprises methane and ethane.

the permeate product gas stream comprises at least 94% methane.

the liquid retentate product stream comprises $C_{3+}$ hydrocarbons having methane and ethane dissolved therein.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Membrane separation process are considered to be energy efficient processes because they do not require a thermal driving force to separate mixtures. Polymeric membranes in particular have been widely utilized in gas separations, such as air dehydration, oxygen/nitrogen separation, hydrogen purification, and $CO_2$, $H_2S$ and higher hydrocarbon removal from natural gas and biogas. Several operating parameters affect the membrane separation efficiency, including the intrinsic membrane selectivity, pressure ratio, temperature, and stage cut. The pressure ratio is the ratio of the feed pressure to the permeate pressure. Stage cut is defined as the fraction of feed gas that permeates across the membrane to emerge as the permeate and may be expressed as the quotient of the permeate flow divided by the feed flow. The higher the stage cut, the higher the flow rate at which the gas permeates through the membrane. For gas separations with product gases at the higher pressure side (i.e., the retentate side) such as $N_2$ and natural gas, a higher stage cut means more product gas wasted. An optimized membrane process with product at the high pressure side would require the membrane to achieve the desired product purity at the lowest stage cut. The permeate gas composition gradually approaches to the feed gas composition as the stage cut approaches 100%: a dead end gas separation scenario. A dead end gas separation membrane process has been considered to be no value since the feed gas composition and the permeate gas composition are identical.

Figure 1:
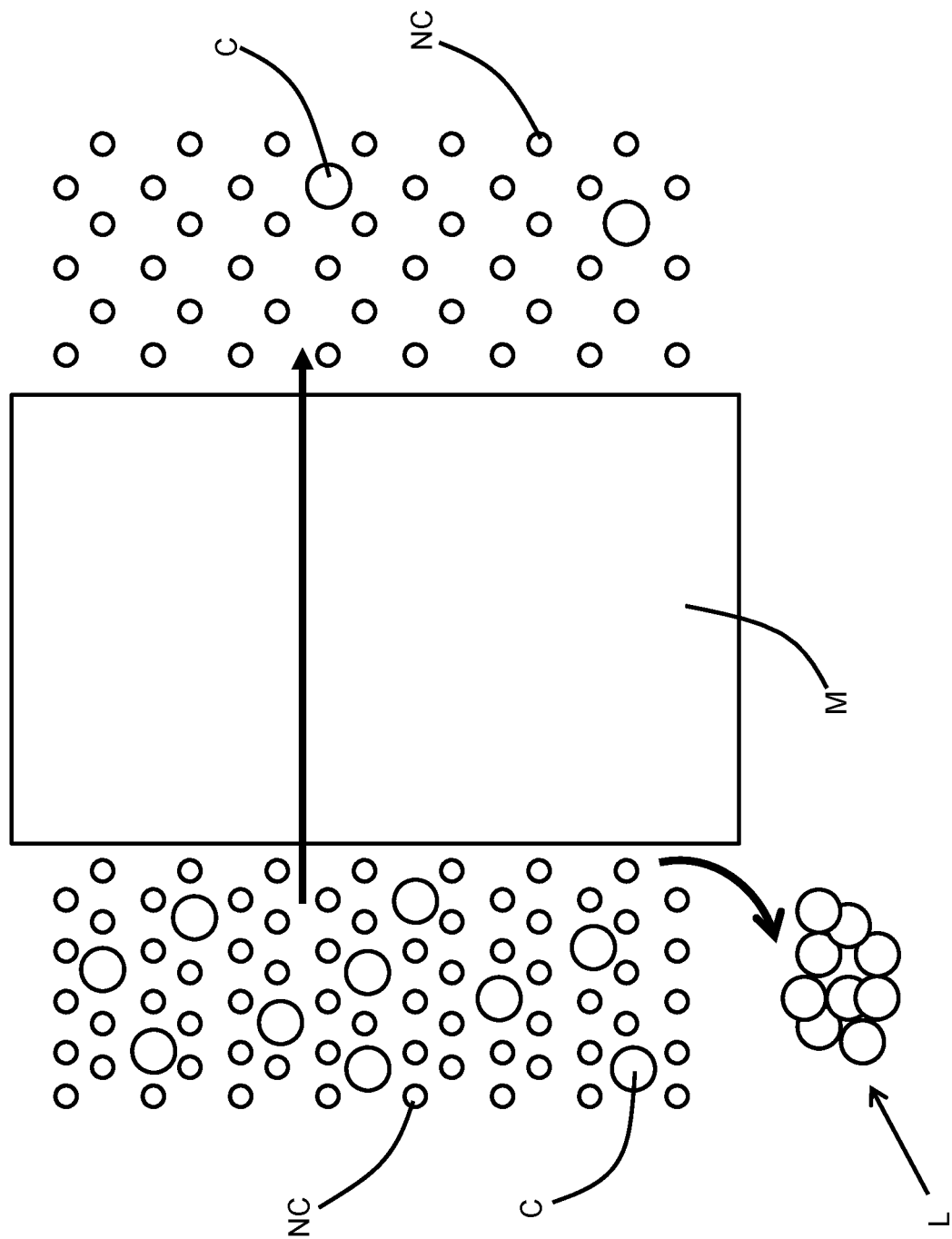
FIG. 1 is a visualization of the mechanism of the invention.

In contrary to conventional belief, we have now identified situations where a "dead end" membrane gas separation process (or membrane separation processes close to a "dead end") may be very useful and relatively energy efficient: those in which the feed stream contains components ("condensables") that are condensed when other components ("non-condensables"), permeate through the membrane. As shown in FIG. 1, a feed fluid stream (which may be wholly gaseous or may be biphasic including liquid and gaseous phases) contains condensable gases C and non-condensable gases NC. The feed fluid stream is fed to a gas separation membrane M that includes a thin, dense, gas separation layer. The gas separation membrane M exhibits lower gas permeances for the condensable gases C in comparison to the non-condensable gases NC. In other words, the membrane M is more selective for the non-condensable gases NC. As the non-condensable gases NC transport through the membrane M, the saturated feed gas (if it has not already become) becomes over saturated and the condensable gases C starts to condense, forming liquid condensate L. As more and more non-condensable gases NC are permeated, more and more consensate L is formed. Unlike conventional gas separation processes, the feed gas composition is maintained at a more or less fixed temperature and pressure, even though the stage cut is 100% or close to 100%, such as from greater 70% to less than 100%.

The process shown in FIG. 1 may be contrasted with a pervaporation membrane process. Pervaporation (first coined from the combination of permeation and evaporation) is a membrane process involving separation of liquid mixture through a dense selective layer of an asymmetric membrane. The mechanism for pervaporation may be conceptually viewed as a combination of two distinct processes: evaporation and gas separation. A liquid feed fluid containing volatile components is fed into a membrane that has a dense separation layer. At the surface of the membrane, relatively more volatile components, along with some relatively less volatile components, vaporize forming a vapor phase. This vapor phase is then selectively separated by the membrane to yield a permeate that is enriched in one or more components of the liquid feed and deficient in other components. In contrast, the dead end (or close to dead end) gas membrane separation process may be viewed as a different combination of two processes: gas separation and condensation. Thus, the dead end (or close to dead end) gas membrane separation process may be called "perdensation" (permeation plus condensation), a novel separation membrane process.

Condensation in the process of the invention occurs at the dew point. In this context, the dew point itself is defined as the temperature at which saturation of at least one component in a gas mixtures occurs, at a given pressure. Because the process of the invention is a dynamic and not static process, condensation occurs without requiring cooling of the feed fluid mixture. The condensation can be modelled by a comparison of the vapor pressure of the component ($p_{A*}$) with the partial pressure of the component ($p_A$) in the feed stream. When the vapor pressure is greater than the partial pressure of the component A, there is no condensation. When they become equal, condensation begins. The permeation of the non-condensable gases effectively increases the partial pressure of the condensable gases, thus promoting the formation of liquid condensate by decreasing the partial pressure of the non-condensable component at the membrane surface. Latent heat is generated from the condensation. The release of latent heat of course will cause the temperature of the feed fluid mixture and/or liquid condensate to rise. This increase in temperature causes the vapor pressure of each component of the feed fluid mixture to increase, thereby tending to decrease the efficiency of liquid condensate formation. Therefore, the latent heat released during the perdensation process may be optionally removed with cooling.

As condensable components condensed on the feed side of the membrane, some latent heat will be released and increase the temperature of the feed fluid mixture and/or liquid retentate. Depending upon the predominant gas to be permeated and whether the temperature of the permeate gas is above or below the inversion temperature of that gas, the reduced-pressure permeate of some non-condensable gases (such as $CO_2$) will drop in temperature due to the Joule Thomson effect. This reduced temperature permeate can to some extent absorb, via the membrane, the latent heat that is released by the condensation of the liquid retentate. On the other hand, hydrogen (which has a relatively low inversion temperature) in a pressure-reduced permeate will experience an increase in temperature at normal membrane operating conditions, thereby further increasing the temperature of the liquid retentate by heat transfer through the membrane. In this latter case, in order to ameliorate reduced formation of the liquid retentate due to this rise in temperature of the permeate, external cooling around the membrane module may be optionally used.

The configuration of the membrane(s) is not limited and may include flat sheet (spiral wound or not) and hollow fibers. Both types of membranes are well-known in the field of gas separation membranes.

The membrane may be composite, including a separation layer that is extruded with, or coated upon, a core or substrate support layer that is chemically distinct from the separation layer. Otherwise, the membrane may be non-composite (for example, an asymmetric membrane) in which case the membrane is formed from a single material.

In the case of composite membranes, the substrate may be polymeric or inorganic. The material of the substrate is not limited and may include polymers, copolymers, elastomers, ceramics, and carbon molecular sieve (CMS) membrane materials. Advantageous materials for the substrate include those having relatively high porosity and strength. Polymeric membrane substrates are preferred since polymeric substrates may be easily scaled up. Preferably, the polymeric substrate should not be affected or damaged by the liquid condensate formed during the perdensation process. One of the ideal candidates for the substrate material is poly(ether ether ketone) (PEEK), a semi-crystalline polymer insoluble in almost all conventional organic solvents. PEEK hollow fiber membrane substrates have been successfully prepared and commercialized by a melt extrusion process and are commercially available from Air Liquide. The material of the separation layer may either be coextruded with the substrate or coated upon the substrate after extrusion thereof.

In the case of a non-composite membrane, the membrane is asymmetric in that it has a porosity gradient extending across the width of the membrane. In this way, it may be considered to have a relatively porous support layer on which is disposed an ultra-thin dense separation layer.

Regardless of whether a composite membrane is used or not, the material of the separation layer is a polymer exhibiting a selectivity for the incondensable component over the condensable component.

The material of the separation layer is not limited but rather depends upon the mixture of incondensable and condensable gases sought to be separated because it must exhibit a selectivity that is sufficient to satisfactorily separate the incondensable and condensable gases of the feed fluid mixture into the gaseous permeate and liquid or biphasic retentate. Typically, the selectivity of the main component (by main component, we main the component having the highest concentration component) of the incondensable gases to each of the condensable gases is at least about 1.5, typically greater than or equal to 2.0 and may range as high as 500, while the permeance is typically at least about 10 GPU, more typically at least 50 GPU or 100 GPU and may range as high as 1000 GPU for gases such as hydrogen, wherein $1\ GPU = 10^{-6}\ cm^3\ (STP) \cdot cm^{-2} \cdot s^{-1} \cdot (cm\ Hg)^{-1}$.

The material of the separation layer may include polymers, copolymers, elastomers, ceramics, and carbon molecular sieve (CMS) membrane materials. Typical selective layer materials include polysulfones; poly(styrenes), including styrene-containing copolymers such as acrylonitrilestyrene copolymers, styrene-butadiene copolymers and styrene-vinylbenzylhalide copolymers; polycarbonates; polyfurfuryl alcohol; cellulosic polymers, such as cellulose acetate-butyrate, cellulose propionate, ethyl cellulose, methyl cellulose, nitrocellulose, etc.; poly-amides and polyimides, including aryl polyamides and aryl polyimides; polyethers; polyetherimides; polyetherketones; polyaryletherketones; polyetheretherketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polypyrrolones; polysulfides; polymers from monomers having alpha-olefinic unsaturation other than mentioned above such as poly(ethylene), poly(propylene), poly(butene-I), poly(4-methyl pentene-1), polyvinyls, e.g., poly(vinyl chloride), poly(vinyl fluoride), poly(vinylidene chloride), poly(vinylidene fluoride), poly (vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; interpolymers, including block interpolymers containing repeating units from the above such as terpolymers of acrylonitrile-vinyl bromide-sodium salt of para-sulfophenylmethallyl ethers; polymers of inherent microporosity (PIM); grafts and blends containing any of the foregoing; perfluoropolymers; and carbon molecular sieve (CMS) membranes made from pyrolysis of any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Particularly useful separation layer materials are those having a selectivity of least 1.5 for light gases such as oxygen, nitrogen, methane, ethane, and hydrogen over C3+ hydrocarbons. Some particular examples include glassy polymers made from amorphous perfluoropolymers such as The most suitable glassy membrane materials for perdensation separation are commercially available amorphous perfluorinated polymers, such as copolymers of 2,2-bistrifluoromethyl-4,5-difluoro-1,3-dioxole (PDD) and tetrafluoroethylene (TFE) (commercially available as Teflon AF 1600 and Teflon AF 2400 with 65% and 87% mol % of PDD, respectively), copolymers of 2,2,4-trifluoro-5-trifluoromethoxy-1,3-dioxole and tetrafluoroethylene (commercially available as HYFLON AD), 2,2,4-trifluoro-5-trifluoromethoxy-1,3-dioxide based polymer, and poly (perfluorobutenyl vinyl ether). Both Teflon AF and Hyflon AD polymer series exhibit high permeabilities towards non-condensable gases and low permeabilities towards condensable VOCs. For example, for Teflon AF 1600, the permeability for nitrogen is 79 Barrer and the nitrogen/propane selectivity is 21 at 30° C. Perfluorinated amorphous polymers are readily soluble in perfluorinated solvents and a composite membrane with a thin perfluorinated dense separation layer can be readily available by the so called dip-coating technique.

One particularly suitable type of membrane for use in the process of the invention is composite hollow fiber membranes having a PEEK substrate and a thin Teflon AF amorphous polymer over the substrate as the separation layer.

The feed fluid mixture is either wholly gaseous or a biphasic mixture of gas and liquid. The fluid mixture includes condensable gas components and non-condensable gas components. While not limited to such, the fluid mixture is typically a mixture of condensable hydrocarbons, such as propane, butane and $C_{3+}$ hydrocarbons, and non-condensable gases, such as methane, ethane and carbon dioxide. In biphasic mixtures, the gas phase typically has a pressure above 6 atm, but may be greater than 20 atm, or even greater than 40 atm.

Condensable components are defined as gases that have a boiling point higher than −100° C. at a pressure of 1 atm absolute. A non-limiting list of condensible gas components includes propane, butanes, pentanes, higher hydrocarbons acetone, methanol, hexane, and other organic solvents. Non-condensable components are defined as gases that have a boiling point lower than −100° C. at a pressure of 1 atm absolute or which exist as gases at room temperature and at a pressure of 1 atm absolute and which may only be condensed at pressures in excess of 5 atm. A non-limiting list of non-condensable gas components includes methane, ethane, hydrogen, nitrogen and carbon dioxide.

In some embodiments, there is no retentate port for removal of a retentate gas. In other words, no exit is present in the module for a retentate that is wholly in gaseous form. There is, however, a liquid port for the liquid retentate (formed by condensation of the second gas) that is formed in the pressure vessel enclosing the membrane(s). The level of the liquid retentate is prevented from rising above a portion of the membrane(s), because immersion of the membrane(s) in the liquid retentate would decrease the membrane separation efficiency. The pressure vessel is oriented and the membrane(s) are positioned within the pressure vessel so that there is sufficient room for the liquid retentate to accumulate before it is drained from the pressure vessel. The liquid retentate port includes a pressure-regulated liquid level control valve so the liquid retentate may be periodically drained. This valve is set to the pressure of the gas mixture that is fed to the membrane module. The opening and closing of the valve, and therefore drainage of the liquid retentate from the module, is controlled based upon a liquid retentate level sensed by a liquid level sensor within, or operatively associated with, the module.

For biphasic retentates, the gas phase is recycled to the inlet of the membrane module (with or without intermediate heating, cooling, pressurization, or combination with the fluid feed mixture) while the liquid phase is withdrawn from a liquid retentate port.

The level sensor may incorporate a programmed controller or a programmed controller may be separate from the level sensor and may control operation of the valve based upon a signal communicated by the level sensor to the controller. Alternatively, a programmed controller may control the opening and closing of the valve based upon one or more flows of feed gas or permeate or the passage of time. In other words, data may be collected allowing the operator to predict when an undesirably high level of liquid retentate may have accumulated within the module. As one example of an undesirably high level of liquid retentate, those skilled in the art will recognize that immersion of a part or entirety of the membrane may deleteriously affect performance of the membrane.

As mentioned above, the retentate is either wholly liquid or at least partially liquid. For embodiments in which the retentate is partially liquid, at least 50 mol % and more typically at least 70 mol % of the condensable components of the feed fluid mixture is recovered in the liquid phase. Those of ordinary skill in the art, upon reading this disclosure, will recognize that such a recovery of condensable component(s) in the liquid phase may be achieved by selecting an appropriate stage cut, pressure ratio, and/or pressure drop from the feed fluid mixture to the permeate stream. The stage cut is typically from about 50% to about 100%, more typically from about 70% to about 100%. The pressure of the feed fluid mixture fed to the module is typically higher than about 50 psig (3.45 barg), more typically higher than about 100 psig (6.89 barg), and even more typically higher than about 150 psig (10.3 barg). This pressure may range from about 50-1500 psig (3.45-103 barg), more typically, 100-1000 psig (6.89-70.0 barg), or even more typically, 150-900 psig (10.3-62.1 barg). The pressure of the permeate stream exiting the module is typically about 0 psig to about 50 psig. The pressure ratio is typically above 2, more typically above 3, and even more typically above 5. Typically, the permeate pressure is at least 3 atm lower than that of the feed fluid mixture fed to the membrane.

Contrary to popular belief in the field of gas separation, the invention is believed to be extremely useful for separation of gases containing volatile condensable gases, including: unstabilized natural gas liquids (NGLs), associated gas; mixtures of hydrogen and hydrocarbons from hydrogenation plants; volatile organic compound (VOC) containing industrial waste gases such as those derived from manufacturing, chemical production, or petroleum refining operations; and mixtures of air and gasoline vapor. VOCs include any compound of carbon, excluding carbon monoxide, carbon dioxide, carbonic acid, metallic carbides or carbonates and ammonium carbonate, which participates in atmospheric photochemical reactions. Common examples include benzenes, esters, alcohols, ketones, alkanes, chloroalkanes, and alkenes. For unstabilized NGLs or associated gas, the heavier $C_{3+}$ hydrocarbons may be separated from the more volatile $C_{1-2}$ hydrocarbons. For mixtures of hydrogen and hydrocarbons, the heavier $C_{3+}$ hydrocarbons may be separated from hydrogen and the more volatile $C_{1-2}$ hydrocarbons. For industrial waste gases containing VOCs, the VOCs may be separated from the balance of the gas, such as flue gas or air. For gasoline stations, air may be separated from the gasoline vapors.

So long as the membrane(s) are not submerged in the liquid retentate, the configuration of the membrane module is not limited. Four illustrative configurations are shown in FIGS. 2-5.

Figure 2:
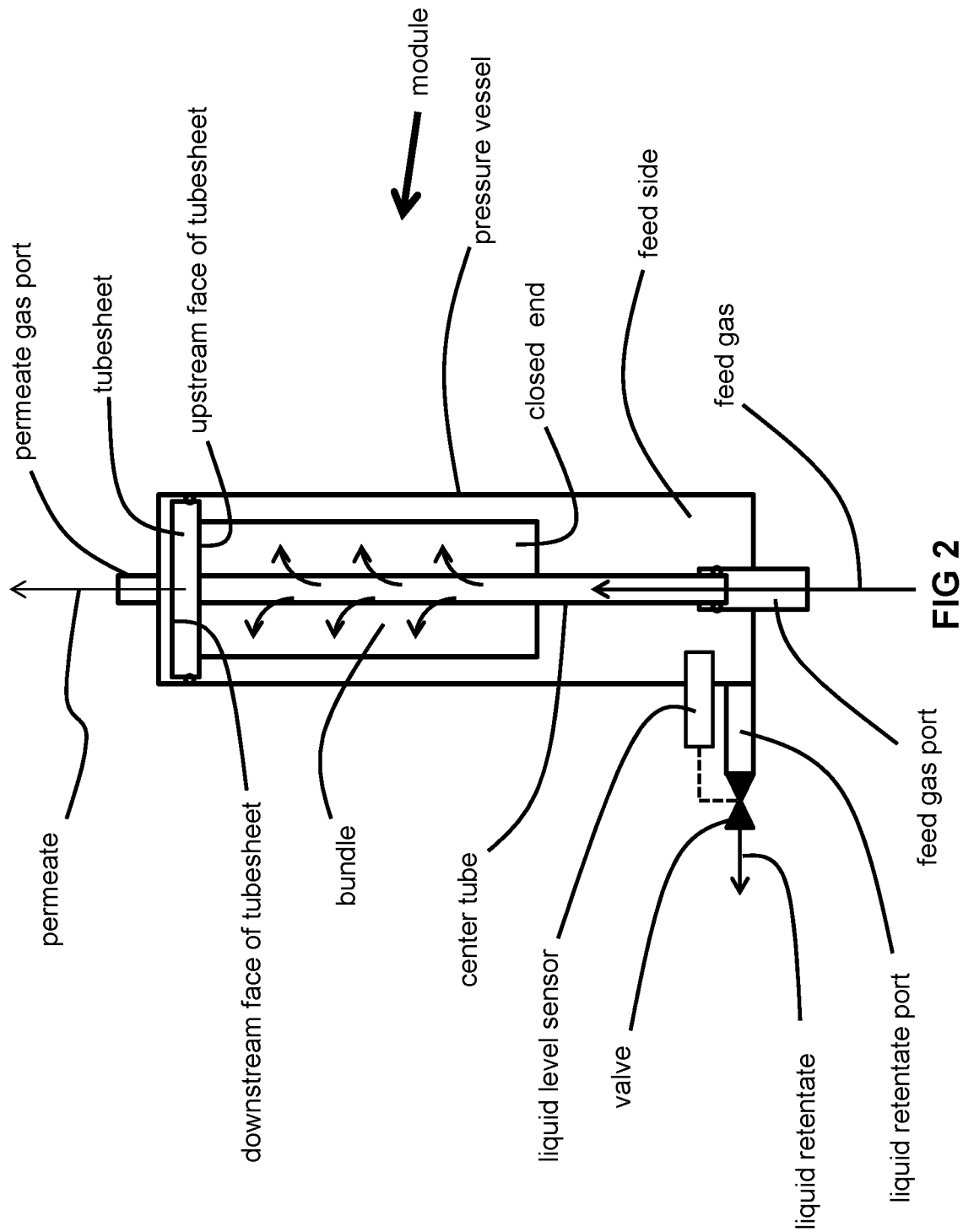
FIG. 2 is a schematic of one particular membrane module configuration suitable for use in the invention.

As best illustrated by FIG. 2, the feed gas is fed to a feed gas port. As indicated by the flow arrows, the feed gas flows out of the feed gas port and into a center tube. The center tube constrains the flow of feed gas at an upstream end thereof. The feed gas radially exits the center through perforations formed in portion of the center tube that is adjacent the bundle of hollow fibers.

The incondensable gases permeate across the membrane and into the bores of the hollow fibers. The permeate (made up by the permeated incondensable gases) is withdrawn from the hollow fiber bores at the tubesheet end of the bundle and out of the module via the permeate gas port.

The feed gas side of the module is separated from the permeate side of the bundle by the presence of the tubesheet (which may be provided with an O-ring to enhance sealing). The feed gas side of the module is the space defined by the inner surface of the pressure vessel upstream of the tubesheet, the upstream face of the closed end of the hollow fiber bundle, the upstream face of the tubesheet, and the outer surfaces of the hollow fibers. On the other hand, the permeate "side" is defined by a plurality of spaces, including the bores of the hollow fibers, cavities formed within the tubesheet that fluidly communicate with the hollow fiber bores, the downstream face of the tubesheet, and the inner surface of the portion of the pressure vessel that is downstream of the tubesheet. One of ordinary skill in the art will recognize that, in a plate-type membrane, the permeate side is the side of the plate-shaped membrane opposite the side which the feed gas is fed to. For purposes of clarity, the permeate side of the module is not labeled.

The condensable gases on the feed side of the module condense into liquid retentate. Because the module is oriented vertically as depicted in FIG. 2, the liquid retentate collects, by the force of gravity, inside a bottom of the pressure vessel adjacent the feed gas port. Exit of the liquid retentate from the liquid retentate port via the liquid retentate port is allowed or prevented by the presence of a valve. A level sensor senses a level of the liquid retentate within the module and controls the opening and closing of a valve in order to prevent the level of the liquid retentate within the module rise to an undesirable level.

Figure 3:
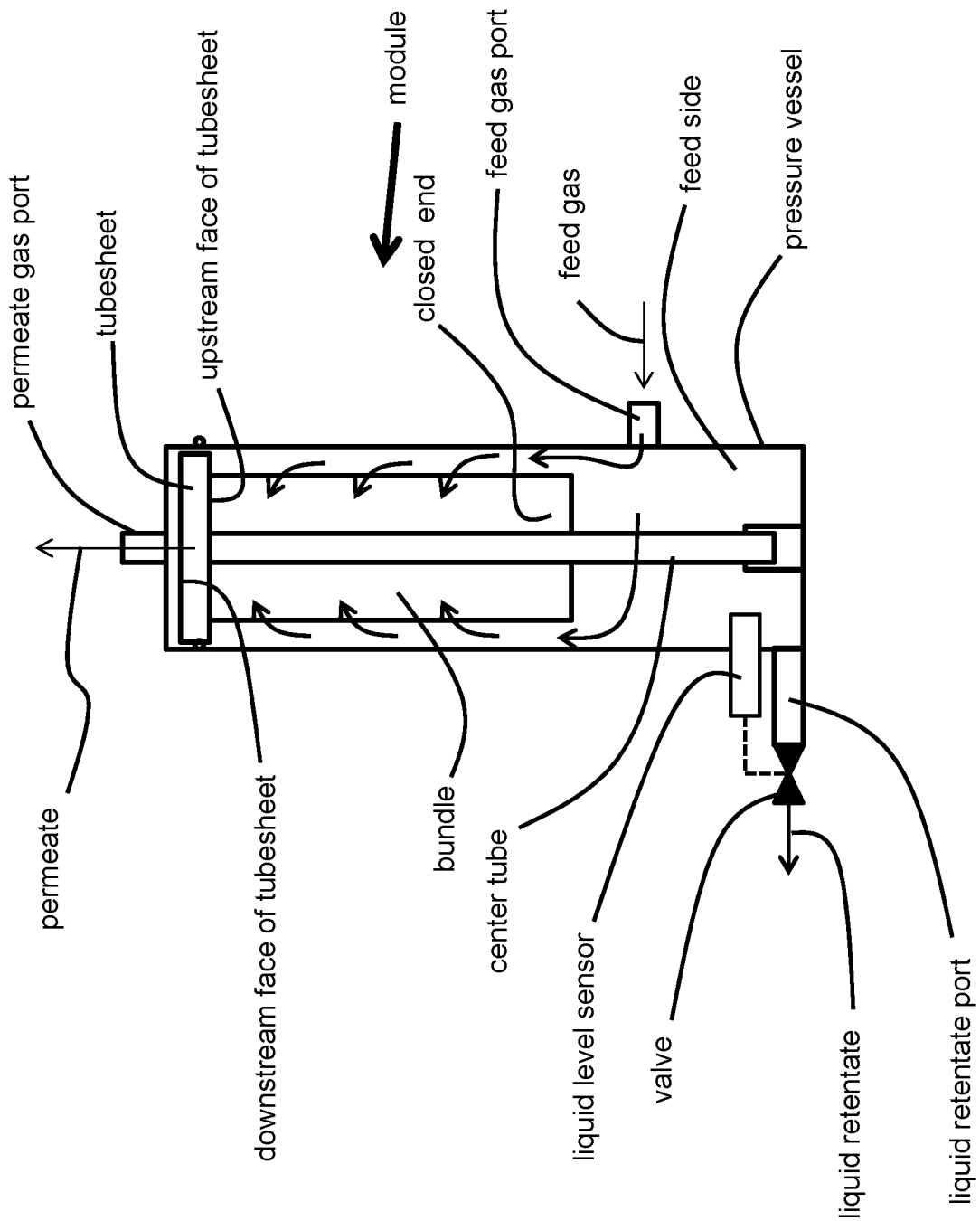
FIG. 3 is a schematic of another particular membrane module configuration suitable for use in the invention.

Similar to the module of FIG. 2, the module shown in FIG. 3 is also oriented vertically. In contrast to the module of FIG. 2, however, the feed gas port is located on a circumferential side of the module and does not direct the flow of feed gas into the center tube. Nor does it result in a radial flow of feed gas to the bundle of hollow fibers from the center tube. Rather, as seen by the flow arrows, the feed gas flows from the feed gas port and to the outside surfaces of the hollow fibers of the bundle where the incondensable gases permeate across the walls of the hollow fiber and into the bores thereof. Otherwise, the structure and function of the module of FIG. 3 is the same as that of FIG. 2.

Figure 4:
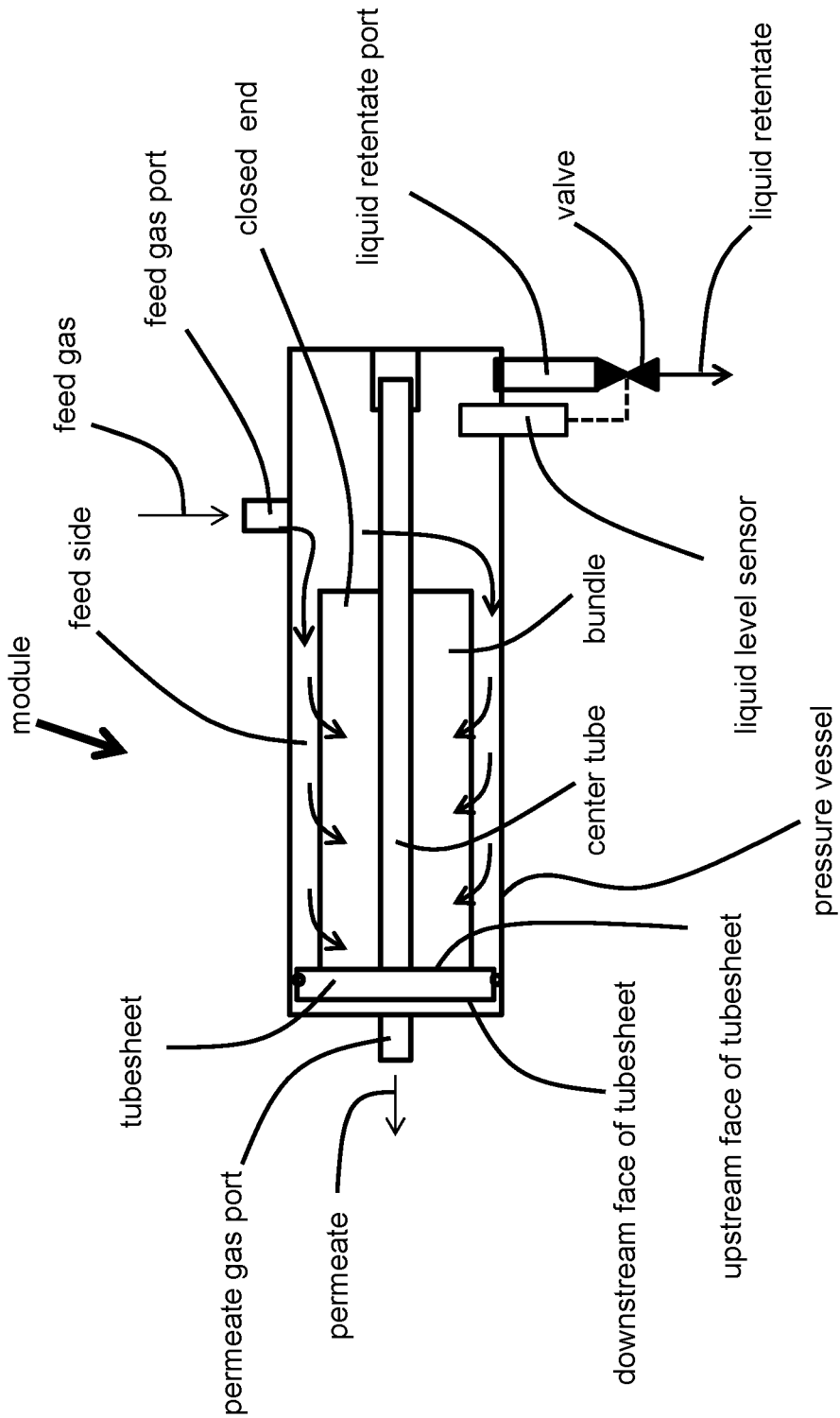
FIG. 4 is a schematic of yet another particular membrane module configuration suitable for use in the invention.

The module illustrated in FIG. 4 is the same as that of FIG. 3 except that it is oriented horizontally. The module of FIG. 4 is positioned so that the liquid retentate port is disposed on the bottom of the horizontal module so that opening of the valve allows the liquid retentate to be drained by force of gravity. The structure and function of the module of FIG. 4 is in all other respects the same as those of FIG. 3.

Figure 5:
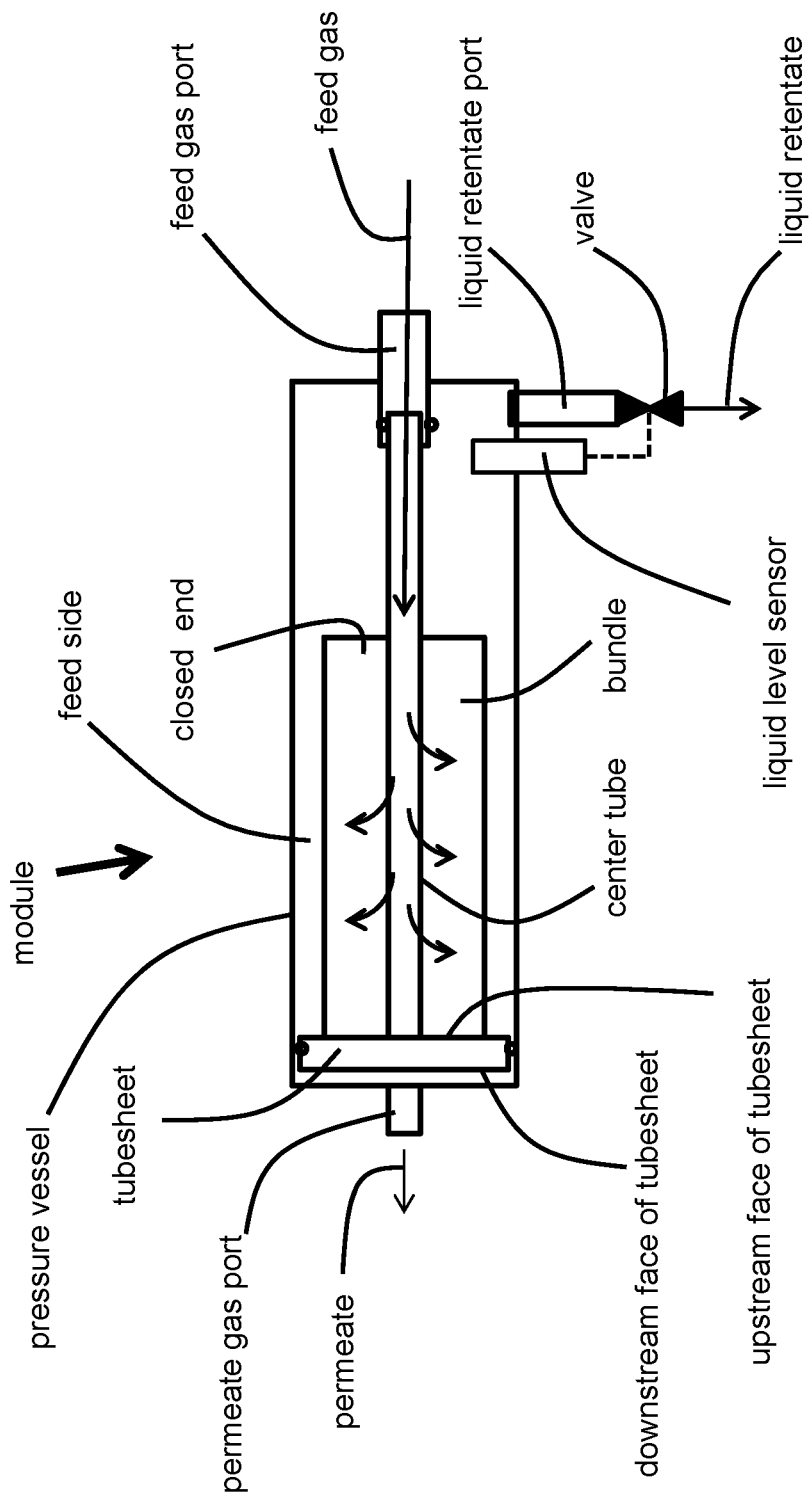
FIG. 5 is a schematic of still another particular membrane module configuration suitable for use in the invention.

The module illustrated in FIG. 5 is the same as that of FIG. 2 except that it is oriented horizontally. The module of FIG. 5 is positioned so that the liquid retentate port is disposed on the bottom of the horizontal module so that opening of the valve allows the liquid retentate to be drained by force of gravity. The structure and function of the module of FIG. 5 is in all other respects the same as those of FIG. 2.

The dead-end membrane module of the invention can be part of a one-stage, two-stage or even three or more-stage separation scheme.

Figure 6:
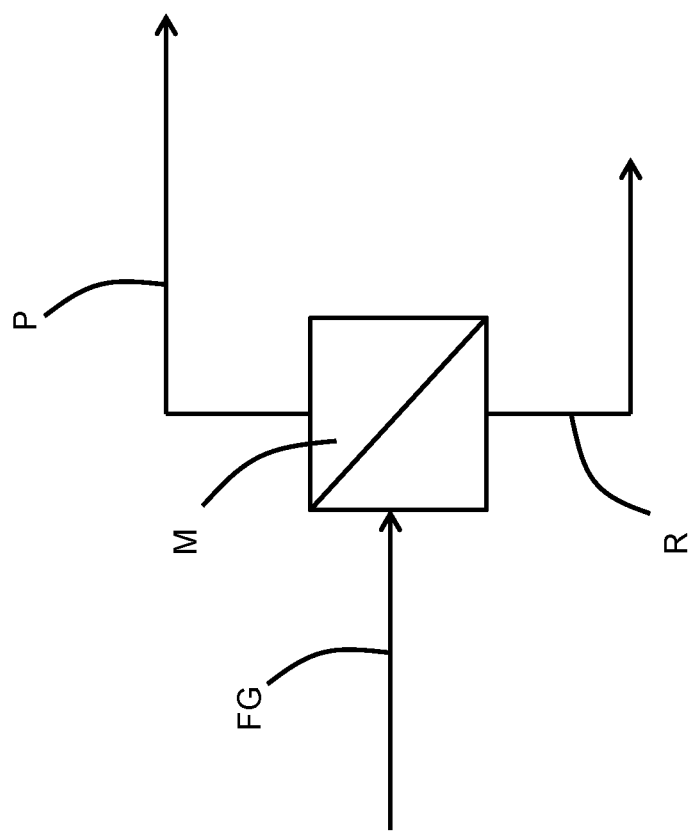
FIG. 6 is a schematic of a higher pressure single stage separation scheme suitable for use in the invention.

As best illustrated in the one stage dead end membrane separation process of FIG. 6, the gas mixture FG is fed to a gas separation membrane module M. The incondensable gases are withdrawn as permeate P while the condensable gases condense and collect as a liquid retentate R. The liquid retentate R is withdrawn from module M and is the product liquid, such as NGLs. The permeate P is the product gas, such as fuel for powering onsite machinery (e.g., compressors or gas turbines). The scheme of FIG. 6 is typically used when the pressure of the feed gas FG is satisfactorily high enough. The feed pressure can be in the range of atmospheric pressure to 1500 psi. If a relatively low pressure such as atmospheric pressure is used, a vacuum can be conveniently used to create the driving force for the non-condensable components. In such a case, the consequent driving force (for permeation of the non-condensable components across the membrane) is sufficient to produce a permeate P/product gas and a (liquid) retentate R/product liquid having satisfactory purities.

The one-stage scheme of FIG. 6 is useful for many applications, such as NGL stabilization and gasoline vapor recovery.

In one particular example of a separation utilizing the scheme of FIG. 6, the gas mixture FG is unstabilized NGLs or associated gas at a pressure of about 200 psi abs or lower (13.8 bar abs or lower). The permeate P may be used as a fuel gas to power production machinery such as compressors and gensets (i.e., a combined diesel engine and electrical generator) to generate electricity. The liquid retentate R is product liquid NGLs predominantly containing $C_{3+}$ hydrocarbons. The NGL mixture is often called Y-Grade NGLs, which can be further processed. Fractionation yields varying amounts of natural gas liquids (NGLs): propane (C3), iso-butane (I-C4), butane (N-C4), and natural gasoline (C5+), and each have their own uses and dedicated markets. (In this case, the permeate P may contain levels of heavier $C_{3+}$ hydrocarbons that are satisfactorily low enough for the permeate P to either be used as fuel gas onsite (e.g., in compressors or in a turbine) or to be injected into a natural gas pipeline after optional further non-membrane purification/processing. Also, the levels of heavier $C_{3+}$ hydrocarbons present in the permeate P (from permeation across the membrane) do not result in a BTU/calorific value of the permeate being too high for either of the two afore-mentioned uses of the permeate. Also, the levels of methane and ethane in the liquid retentate R are low enough to avoid the necessity of having further gas membrane purification. Moreover, any decrease in the theoretical recovery of NGLs in the liquid retentate R (caused by permeation of amounts of heavier $C_{3+}$ hydrocarbons across the membrane and the lack of further separation of the permeate) is limited.

In another particular example of a separation utilizing the scheme of FIG. 6, the gas mixture FG is a mixture of hydrogen and hydrocarbons from refinery off gases (after amine treatment) from a hydroskimmer, hydrocracker, and/or a gasoline unit. In this case, the permeate P is product gas hydrogen and the liquid retentate R is liquid product heavier $C_{3+}$ hydrocarbons (one example of which is liquid propane gas (LPG)).

In yet another particular example of a separation utilizing the scheme of FIG. 5, the gas mixture is VOC-containing industrial waste gases such as those derived from manufacturing, chemical production, or petroleum refining operations. In this case, the permeate P is waste gas and the liquid retentate R is liquefied VOCs. As a particular example, the scheme of FIG. 6 may be used to recover VOCs from oil refinery farm tanks. If the pressure of the raw gas is too low to provide an effective driving force across the membrane, a vacuum may be applied to the permeate side of the membrane in order to achieve the desired pressure ratio for the separation at hand.

In still another particular example of a separation utilizing the scheme of FIG. 6, the gas mixture is a mixture of air and gasoline vapor. In this case, the permeate P is air (which may contain an amount of hydrocarbons and/or ethanol) and the liquid retentate R is predominantly $C_{4+}$ hydrocarbons. This scheme is particularly useful for the recovery of gasoline vapors form the vents of storage tanks at gasoline filling stations. The existing vacuum pump ordinarily present at the gasoline station can be utilized to provide the desirable pressure ratio for the vapor/air separation. At relatively high pressure, the liquid retentate can contain significant amounts of dissolved non-condensable gases. The higher the pressure, the higher the solubility of the non-condensable gases, according to Henry's law. On the other hand, relatively higher pressures provide a higher driving force and reduces the required membrane area. In a process called stabilization, the high pressure liquid retentate may be flashed to a lower pressure in order to release the dissolved non-condensable gases.

Figure 7:
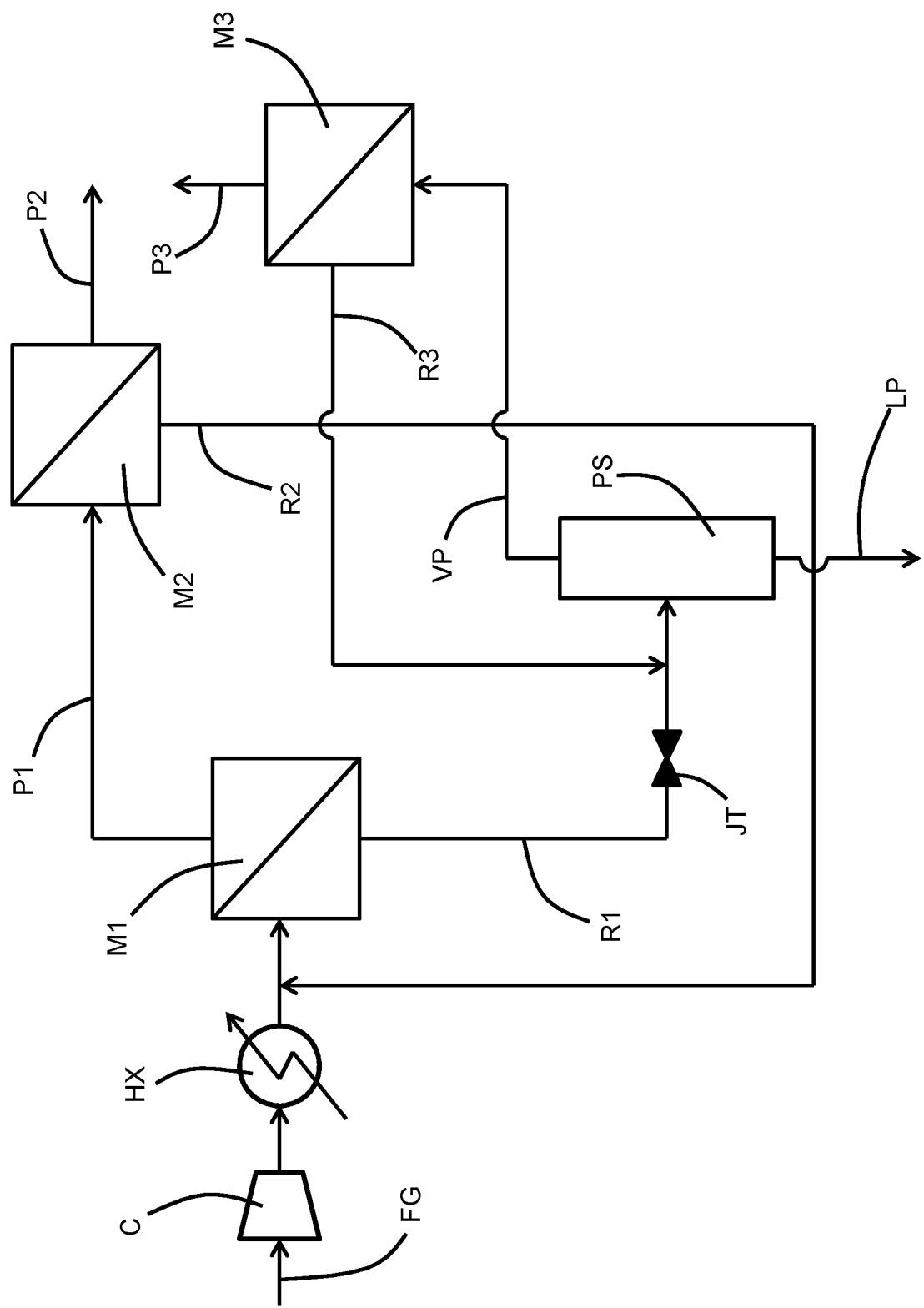
FIG. 7 is a schematic of a lower pressure two-stage cascade separation scheme suitable for use in the invention.

Alternatively, the two stage dead end membrane separation process of FIG. 7 may be advantageous As best shown in FIG. 7, the gas mixture FG is optionally compressed at a compressor C, optionally cooled at an optional heat exchanger HX and fed to a first gas separation membrane module M1. The incondensable gases are withdrawn as a gaseous first permeate P1 (the product gas) while the condensable gases condense and collect as a first (liquid) retentate R1. The first permeate P1 contains a major amount of non-condensable gases and a minor amount of the condensable gases that otherwise predominantly collect as liquid retentate in module M1 and thus is enriched in the non-condensable gases and deficient in the condensable gases compared to the gas mixture FG.

The first permeate P1 may be optionally recompressed and fed to an optional second gas separation membrane module M2 where it is separated into a gaseous second permeate P2 and a gaseous second retentate R2. In this case, the second permeate P2 is instead the product gas and is enriched in the incondensable gases and deficient in the condensable gases compared to the first permeate. While the second retentate R2 is enriched in the condensable gases and deficient in the incondensable gases compared to the first permeate P1, it can contain an appreciable amount of non-condensable gases (that otherwise predominantly permeate across the membranes of modules M1, M2). Therefore, the second retentate R2 may be recycled to the feed side of the first module M1 so as to increase recovery of the incondensable gases.

The liquid retentate R1 withdrawn from module M1 is flashed into a biphasic liquid/vapor retentate stream Rb with Joule-Thomson valve JT and separated into a liquid phase LP and vapor phase VP. The liquid phase LP is withdrawn as the product liquid. The vapor phase VP is fed to a third gas separation membrane module M3 where it is separated into a gaseous third permeate P3 and a gaseous second retentate R2. The third permeate P3 is enriched in the non-condensable gases and deficient in the condensable gases in comparison to vapor phase VP. The third permeate P3 is the product gas and may have a same or different concentration of the non-condensable gases in comparison to the second permeate P2 (when the optional second gas separation membrane module M2 is utilized as described above). While the third retentate is enriched in the condensable gases and deficient in the non-condensable gases compared to the vapor phase VP, it can contain an appreciable amount of non-condensable gases. Therefore, it may be recycled to the phase separator so as to increase recovery of the non-condensable gases.

In one example of a separation utilizing the scheme of FIG. 7, the gas mixture FG is unstabilized NGLs or associated gas at a pressure of about 500 to 1000 psi abs (34.5-70.0 bar abs). The second and third permeates P2, P3 may be used as a fuel gas to power production machinery such as compressors or gensets. The liquid phase LP is product liquid NGLs predominantly containing $C_{3+}$ hydrocarbons.

In another particular example of a separation utilizing the scheme of FIG. 7, the gas mixture FG is a mixture of hydrogen and hydrocarbons. In this case, the second and third permeates P2, P3 are product gas hydrogen (which may contain an amount of methane) and the liquid phase LP is liquid product heavier $C_{3+}$ hydrocarbons (e.g., NGLs).

In yet another particular example of a separation utilizing the scheme of FIG. 7, the gas mixture is VOC-containing industrial waste gases such as those derived from manufacturing, chemical production, or petroleum refining operations. In this case, the second and third permeates P2, P3 are waste gas and the liquid phase LP is liquefied VOCs.

In still another particular example of a separation utilizing the scheme of FIG. 7, the gas mixture is a mixture of air and gasoline vapor. In this case, the second and third permeates P2, P3 are air (which may contain an amount of hydrocarbons and/or ethanol) and the liquid phase LP is predominantly $C_{6+}$ hydrocarbons.

The invention yields several advantages. Because the retentate is only in the liquid phase, there is no need for further cooling to condense the condensable gases. Because the liquid is formed by concentrating of the condensable component, the yield is significantly improved. As opposed to conventional techniques for recovery of low concentrations of condensable gases, deep cooling is not required, thereby avoiding a very energy intensive process. The membrane process eliminates the need for the cooling and thus energy efficient. The membrane process is simple to operate and may be used without moving parts. Finally, the membrane process has a smaller footprint in comparison to conventional technologies for recovering the condensable gases.

PROPHETIC EXAMPLES

Example 1

This HYSIS computer simulation of the invention is carried out according to the two stage dead end gas separation membrane process of FIG. 7 without the optional second gas separation membrane module M2 and separation of the first permeate P1 into a second permeate P2 and a second retentate. A raw gas containing 60% methane and 21% ethane with the following gas composition is treated with the two stage membrane process of FIG. 6 using PEEK-Sep hollow fiber membranes commercially available from Air Liquide Advanced Separation. The feed flow is 1.0 million std ft$^3$/day (28,317 std m$^3$/day) and the feed pressure is 90 psi abs (6.2 bar abs). The gas is first compressed up to 600 psi abs (41.4 bar abs) and then fed into the PEEK-Sep hollow fiber membrane. The permeate gas is collected at the pressure of 20 psi abs (1.38 bar abs) and the liquid retentate collected from the bottom of the first stage membrane at the pressure of 600 psia (41.4 bar abs) is flashed to a pressure of 200 psia (13.8 bar abs). The vapor from the flash is then fed into a second stage dead end gas separation membrane to remove the light gas components. The total NGL collected at 200 psi abs (13.8 bar abs) is 670 lb/hr (404 kg/hr).

TABLE IA properties of feed gas, first permeate and first liquid retentate of Example 1

|  | Raw Gas (mol %) | FG after compression (mol %) | P1 (mol %) | R1 (mol %) |
|---|---|---|---|---|
| Pressure (psi abs) | 90 | 600 | 20 | 600 |
| Flow Rate (million std ft$^3$/day) | 1.00 | 1.00 | 0.81 | 0.19 |
| CO$_2$ | 0.63 | 0.63 | 0.77 | 0.07 |
| Nitrogen | 1.88 | 1.88 | 2.31 | 0.13 |
| Methane | 60.56 | 60.56 | 71.15 | 14.6 |
| Ethane | 21.14 | 21.14 | 21.23 | 22.01 |
| Propane | 9.91 | 9.91 | 3.65 | 37.63 |
| i-Butane | 0.00 | 0.00 | 0.00 | 0.00 |
| n-Butane | 3.75 | 3.75 | 0.18 | 17.34 |
| i-Pentane | 0.00 | 0.00 | 0.00 | 0.00 |
| n-Pentane | 1.07 | 1.07 | 0.01 | 5.70 |
| Hexanes | 0.49 | 0.49 | 0.00 | 2.52 |

TABLE IB properties of vapor and liquid phases and second permeate of Example 1

|  | VP (mol %) | LP (mol %) | P2 (mol %) |
|---|---|---|---|
| Pressure (psi abs) | 200 | 200 | 20 |
| Flow Rate (million std ft$^3$/day) | 0.19 | 0.12 | 0.07 |
| CO$_2$ | 0.07 | 0.01 | 0.20 |
| Nitrogen | 0.13 | 0.01 | 0.49 |
| Methane | 14.57 | 1.81 | 39.95 |
| Ethane | 22.01 | 11.82 | 42.26 |
| Propane | 37.63 | 48.30 | 16.18 |
| i-Butane | 0.00 | 0.00 | 0.00 |
| n-Butane | 17.34 | 25.70 | 0.77 |
| i-Pentane | 0.00 | 0.00 | 0.00 |
| n-Pentane | 5.70 | 8.56 | 0.02 |
| Hexanes | 2.52 | 3.79 | 0.00 |

Example 2

This HYSIS computer simulation of the invention is carried out according to the one stage dead end gas separation membrane process of FIG. 6. A raw gas containing 4.22% of hydrogen and 19.68% of methane with the following gas composition is treated with a one stage membrane process using a PEEK-Sep hollow fiber membrane commercially available from Air Liquide Advanced Separations. The feed flow is 1.0 million std ft$^3$/day (28,317 std m$^3$/day) and the feed pressure is 579 psi abs (39.9 bar abs). The permeate gas is collected at the pressure of 87.0 psi abs (6.00 bar abs) and the liquid is collected from the bottom of the membrane cartridge. The total NGLs are collected at 579 psi abs (39.9 bar abs) at a rate of 4006 lb/hr (1817 kg/hr).

TABLE 2 properties of raw gas, permeate and liquid retentate of Example 2

|  | Raw Gas | Permeate | Liquid retentate |
|---|---|---|---|
| Pressure (bar abs) | 39.9 | 6.0 | 39.9 |
| Flow Rate (million std ft$^3$/day) | 1.00 | 0.21 | 0.79 |
| Hydrogen | 4.22 | 18.64 | 0.39 |
| Nitrogen | 2.17 | 8.61 | 0.56 |
| Methane | 19.68 | 53.51 | 10.69 |
| Ethane | 14.52 | 15.21 | 14.42 |
| Propane | 22.61 | 3.32 | 27.72 |
| i-Butane | 21.54 | 0.45 | 27.04 |
| n-Butane | 11.19 | 0.19 | 14.06 |
| i-Pentane | 2.66 | 0.01 | 3.35 |
| n-Pentane | 1.39 | 0.00 | 1.75 |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method of separating components of fluid mixtures to yield a product permeate gas and an at least partially liquid product retentate, comprising the steps of:
feeding a fluid mixture feed stream containing at least one condensable gas component and at least one non-condensable gas component to a gas separation module containing at least one gas separation membrane;
withdrawing a permeate gas product stream from said gas separation module enriched in said at least one non-condensable gas component in comparison to the feed fluid mixture stream, thereby leaving a retentate that deficient in said at least one condensable gas component in comparison to the feed, the retentate being either wholly or partially liquid, said permeate gas product stream being at a pressure of at least 3 atm lower than that of said feed fluid mixture, wherein the liquid portion of the retentate comprises said at least one condensable gas component in condensed form; and
from the retentate in the gas separation module, withdrawing a liquid retentate product stream that is enriched in said at least one condensable component in comparison to the feed fluid mixture stream.

2. The method of claim 1, wherein a ratio of a volumetric flow rate of the permeate gas stream to a volumetric flow rate of the feed fluid mixture ranges from 0.7 to 1.0.

3. The method of claim 1, wherein each of the at least one gas separation membrane is a composite membrane including a separation layer that is extruded with, or coated upon, a substrate support layer that is chemically distinct from the separation layer.

4. The method of claim 3, wherein the substrate is made of a poly(aryl ether ketone).

5. The method of claim 1, wherein each of the at least one gas separation membrane includes a separation layer made of an amorphous perfluoropolymer.

6. The method of claim 1, wherein each of the at least one gas separation membrane has a separation layer made of a polymer exhibiting a selectivity for the at least one non-condensable gas component over the at least one condensable gas component.

7. The method of claim 1, wherein the at least one non-condensable gas comprises a main component having a highest concentration of all of the components of the at least one non-condensable gas, a selectivity of each of the at least one gas separation membrane for the main component of the non-concensable gases over each of the condensable gas(es) is at least about 1.5.

8. The method of claim 1, wherein the at least one non-condensable gas comprises a main component having a highest concentration of all of the components of the at least one non-condensable gas, a permeance of the main component of the at least one non-condensable gas in the at least one gas separation membrane is at least 10 GPU, where 1 GPU=$10^{-6}$ cm$^3$ (STP)·cm$^{-2}$·s$^{-1}$·(cm Hg)$^{-1}$.

9. The method of claim 1, wherein the at least one condensable gas component comprises $C_{3+}$ hydrocarbons and each of the at least one gas separation membrane has a separation layer with a selectivity of least 1.5 for the at least one non-condensable gas over $C_{3+}$ hydrocarbons.

10. The method of claim 1, wherein the at least one non-condensable gas is selected from one or more of oxygen, nitrogen, methane, ethane, and hydrogen.

11. The method of claim 1, wherein each of the at least one gas separation membrane has a separation layer made of an amorphous perfluoropolymer.

12. The method of claim 11, wherein the amorphous perfluoropolymer is selected from one or more of copolymers of 2,2-bistrifluoromethyl-4,5-difluoro-1,3-dioxole and tetrafluoroethylene, copolymers of 2,2,4-trifluoro-5-trifluoromethoxy-1,3-dioxole and tetrafluoroethylene, 2,2,4-trifluoro-5-trifluoromethoxy-1,3-dioxole based polymer, and poly(perfluorobutenyl vinyl ether).

13. The method of claim 1, wherein each of the at least one gas separation membrane is a composite hollow fiber membrane having a substrate made of poly(ether ether ketone) and a separation layer made of a copolymer of 2,2-bistrifluoromethyl-4,5-difluoro-1,3-dioxole and tetrafluoroethylene.

14. The method of claim 1, wherein the fluid mixture feed stream is either wholly gaseous or a biphasic mixture of gas and liquid.

15. The method of claim 1, wherein the at least one condensable gas component comprises $C_{3+}$ hydrocarbons and the at least one non-condensable gas component comprises methane, ethane and carbon dioxide.

16. The method of claim 1, wherein the fluid mixture feed stream is biphasic gas/liquid at a pressure of above 6 atm.

17. The method of claim 1, wherein the at least one condensible gas component is selected from one or more of propane, butane, pentane, a $C_{6+}$ hydrocarbon acetone, methanol, and hexane.

18. The method of claim 1, wherein the at least one non-condensable gas component is selected from one or more of methane, ethane, hydrogen, nitrogen, oxygen and carbon dioxide.

19. The method of claim 1, wherein the retentate is biphasic gas/liquid, the gas phase of the retentate is recycled to an inlet of the gas separation membrane module with or without intermediate heating, cooling, pressurization, or combination with the fluid feed mixture stream, and the liquid retentate product stream is withdrawn from a liquid retentate port of the gas separation module.

20. The method of claim 1, wherein the retentate is biphasic gas/liquid and at least 50 mol % of the at least one condensable gas component is recovered in the liquid retentate product stream.

21. The method of claim 1, wherein at least 50 mol % of the at least one condensable gas component in the fluid mixture feed stream is recovered in the liquid retentate product stream.

22. The method of claim 1, wherein a ratio of a volumetric flow rate of the permeate gas product stream to a volumetric flow rate of the feed fluid mixture stream is ranges from 0.5 to 1.0, more typically from 0.7 to 1.0.

23. The method of claim 1, wherein a pressure of the feed fluid mixture stream is higher than 50 psig (3.45 barg).

24. The method of claim 1, wherein a pressure of the feed fluid mixture stream is in a range of 50-1500 psig (3.45-103 barg).

25. The method of claim 1, wherein a pressure of the permeate gas product stream is 0 psig to 50 psig.

26. The method of claim 1, wherein a ratio of a pressure of the fluid mixture feed stream to a pressure of the permeate gas product stream is above 2.

27. The method of claim 1, wherein a pressure of the permeate gas product stream is at least 3 atm lower than that of the feed fluid mixture stream.

28. The method of claim 1, wherein the fluid feed mixture is stream is a stream of unstabilized natural gas liquids comprising a mixture of $C_{1-2}$ hydrocarbons and $C_{3+}$ hydrocarbons.

29. The method of claim 1, wherein the fluid feed mixture stream is a stream of associated gas.

30. The method of claim 1, wherein the fluid feed mixture stream is a stream of a mixture of hydrogen and hydrocarbons, optionally from a hydrogenation plant, optionally the hydrocarbons being a mixture of $C_{1-2}$ hydrocarbons and $C_{3+}$ hydrocarbons.

31. The method of claim 1, wherein the fluid mixture feed stream is a stream comprising volatile organic compound-containing industrial waste gas, the volatile organic compound optionally being selected from one or more of benzenes, esters, alcohols, ketones, alkanes, chloroalkanes, and alkenes.

32. The method of claim 1, wherein the fluid feed mixture stream is a stream comprising one or more volatile organic compounds and either air or flue gas, the volatile organic compound optionally being selected from one or more of benzenes, esters, alcohols, ketones, alkanes, chloroalkanes, and alkenes.

33. The method of claim 1, wherein the fluid feed mixture stream is a stream comprising volatile organic compound-containing industrial waste gas derived from manufacturing, chemical production, or petroleum refining operations.

34. The method of claim 1, wherein the fluid feed mixture stream is a mixture of air and gasoline vapor.

35. The method of claim 1, wherein the fluid feed mixture stream is a stream of unstabilized natural gas liquids or associated gas at a pressure of no greater than 13.8 bar abs, the liquid retentate product stream is liquid natural gas liquids, and said method further comprises the steps of feeding the permeate product gas stream as fuel gas to power production machinery selected from a compressor and/or a combined diesel engine and electrical generator.

36. The method of claim 1, wherein the fluid mixture feed stream is a stream of unstabilized natural gas liquids or associated gas at a pressure of no greater than 13.8 bar abs, the liquid retentate product stream is raw liquid natural gas liquids, and said method further comprises the steps of:
feeding the permeate product gas stream as fuel gas to power production machinery selected from a compressor and/or a combined diesel engine and electrical generator; and
fractionating the raw natural gas liquids to yield streams of propane, iso-butane, butane, and $C_{5+}$ hydrocarbons.

37. The method of claim 1, wherein the feed fluid mixture stream is a stream of a mixture of hydrogen and hydrocarbons from refinery off gases from a hydroskimmer, hydrocracker, and/or a gasoline unit, wherein the permeate product gas stream is hydrogen and the liquid retentate product stream is $C_{3+}$ hydrocarbons.

38. The method of claim 1, wherein the gas separation membrane module, to which the feed fluid mixture stream is fed, is a first stage gas separation module, and said method further comprises the steps of:
feeding the permeate product gas stream to a second gas separation membrane module comprising one or more gas separation membranes that are selective for the one or more non-condensable gas components over the one or more condensable gas components, the second stage gas separation module separating the permeate product gas stream into a further enriched permeate gas stream and a recycle retentate gas stream; and
feeding the recycle retentate gas stream to an inlet of the first gas separation module so as to increase recovery of the at least one non-condensable gas component.

39. The method of claim 1, wherein the gas separation membrane module, to which the feed fluid mixture stream is fed, is a first stage gas separation module and said method further comprises the steps of:
flashing the liquid retentate product stream into a biphasic liquid/vapor retentate stream with a Joule-Thomson valve and
separating the flashed liquid retentate product stream with a phase separator into a lowered-pressure liquid phase stream and a lowered-pressure vapor phase stream;
withdrawing the lowered-pressure liquid phase stream as a product liquid;
feeding the lowered-pressure vapor phase stream to a third stage gas separation membrane module, comprising one or more gas separation membranes selective for the at least one non-condensable gas component over the at least one condensable gas component at which the lowered-pressure vapor phase stream is separated into a third stage permeate gas and a third stage retentate gas; and recycling the third stage retentate gas to the phase separator so as to increase recovery of the at least one non-condensable gas component.

* * * * *